April 14, 1931.  E. C. THOMPSON  1,800,808
COMPENSATING WINDING MECHANISM FOR DEVICES USING ROLLS
Filed July 11, 1928
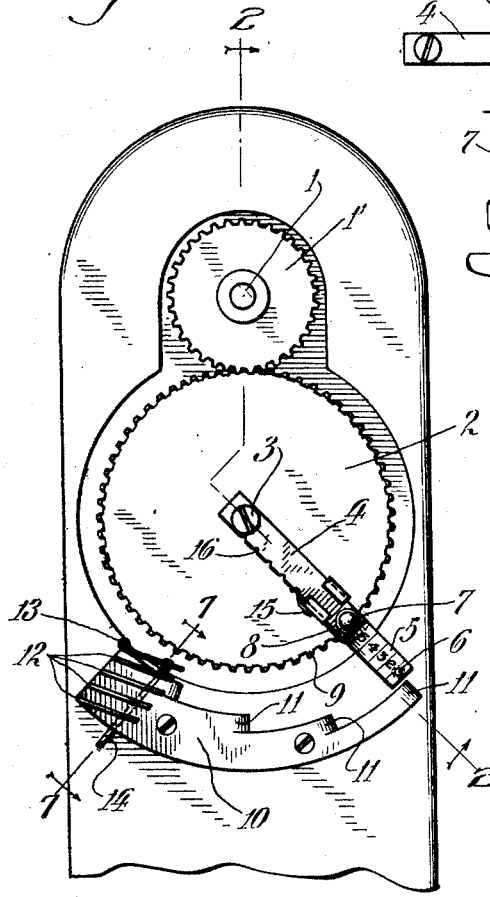
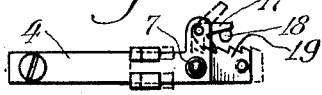
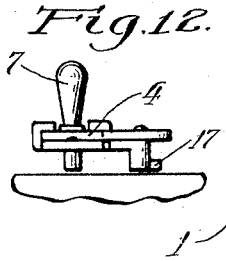
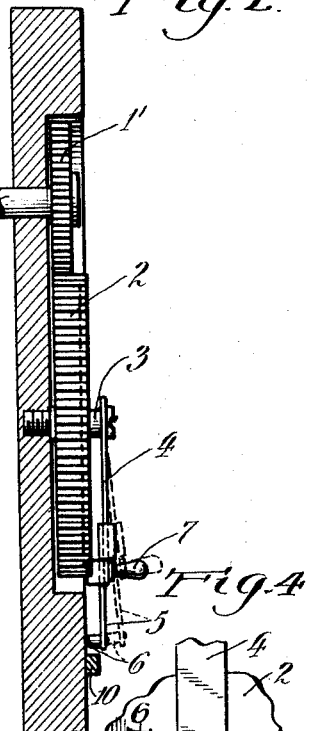
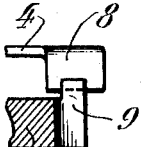
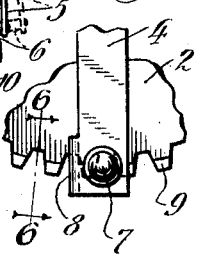
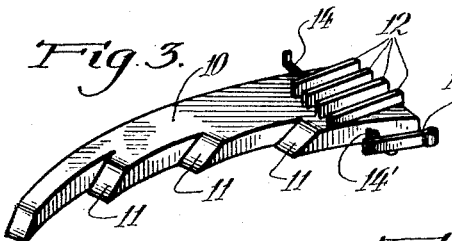
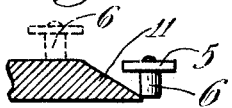
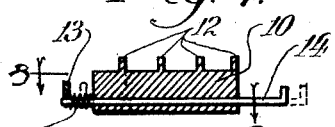
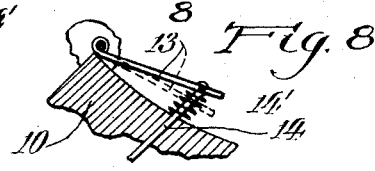
Inventor:
Eugene C. Thompson,
By Frank L. Belknap
Atty.

Patented Apr. 14, 1931

1,800,808

UNITED STATES PATENT OFFICE

EUGENE C. THOMPSON, OF LOS ANGELES, CALIFORNIA

COMPENSATING WINDING MECHANISM FOR DEVICES USING ROLLS

Application filed July 11, 1928. Serial No. 291,892.

The object of my invention is to provide compensating winding gear for roll film camera, and other devices where it may be desirable or expedient to vary the length of film, tape, or other material, taken up by a complete revolution of the winding handle, and to accomplish this end with a simple device, cheaply constructed, and occupying only a small amount of space.

In the drawings, Fig. 1 represents a side elevational view of my invention applied to a roll film camera.

Fig. 2 is a vertical sectional view, taken on line 2—2 of Fig. 1.

Fig. 3 is a perspective view of the stepped or echelon plate, with its raised deflecting or baffle plates.

Fig. 4 is a fragmentary detail of the large winding gear with the inner portion of the teeth routed out so as to form ratchet teeth.

Fig. 5 is a fragmentary view showing the routed teeth, and engagement of a part of the winding crank therewith.

Fig. 6 is a cross sectional view taken on line 6—6 of Fig. 4.

Fig. 7 is a cross sectional view taken on line 7—7 of Fig. 1.

Fig. 8 is a cross sectional view taken on line 8—8 of Fig. 7.

Fig. 9 is a sectional view of the tip of one section of the echelon plate, showing the outer end of the sliding part of the crank engaging the beveled portion of a section of the echelon plate and being raised thereby.

Fig. 10 is a perspective view of the two parts of the compensating winding crank, and indicator showing number of times operated.

Fig. 11 is a top view of an alternate method of feeding the movable section of the winding crank outward.

Fig. 12 is a side view of the alternate method shown in Fig. 11.

In the interest of simplicity of presentation, my device is shown as being applied to the side wall of a roll film camera. To the end of the winding key shaft 1 I attach a small gear wheel 1', and engage therewith a second and larger gear 2, mounted on the stud 3, set into a bed plate attached to the camera wall, or set into the camera wall. On the outer end of the stud 3 is mounted one section 4 of a winding handle, this section being resilient and turning freely on the stud 3. On section 4 is mounted a second section 5, slidable on the part 4, part 5 having at its outer extremity a small pin 6, and, if desired, having stamped thereon figures 5' indicating the number of times the slidable part has been moved forward, or the number of lengths of film exposed. Part 4 of the crank is provided with a thumb knob 7, more clearly shown in Figs. 2 and 10. Part 4 also has a turned down part or nib 8 adapted to engage a protruding tooth of the large gear 2. Adjacent the gear 2, and attached to the bed plate or camera wall is a stepped or echelon plate 10, with the steps cut concentrically to the stud 3, the ends 11 of the steps being preferably beveled. This plate is clearly shown in Fig. 3. At one end of this plate 10, are fixed deflecting wings or baffles, 12, and one movable baffle 13, adapted to be swung in or out by the bar 14, controlled by the spring 14', sliding through the plate 10. The teeth of the gear 2 are preferably routed out sufficiently to afford ratchet teeth, as more clearly shown in Fig. 5.

The small gear 1' is attached to the shaft 1 of the winding mechanism of a roll film camera, for example. Meshing with this gear is a larger gear 2 of such ratio that one full revolution thereof will bring up the requisite length of film for the first exposure. The teeth of this gear 2 are routed so as to afford ratchet teeth. On a stud 3 is mounted a resilient handle or crank 4 turning freely on the stud 3, and a slidable extension 5 is carried on or in the part 4. To wind up the protecting paper of the film roll and bring the film to position for the first exposure the bar 14 is moved outward manually, bringing the movable baffle 13 against the plate 10, and holding said elements in that position while the crank is turned a predetermined number of revolutions sufficient to bring the film to position for the first exposure. The force holding bar 14 is then released, and through the expansion to normal of the spring 14', the bar 14 returns to normal position.

The first exposure is then made, and the crank turned one full revolution, meeting with sufficient additional resistance as it reaches the baffle 12 to warn the operator that the revolution has been completed. Another exposure being made, the crank is given sufficient push to carry the pin 6 of the slidable part 5 along the groove between the first and second baffles 12 and around its course, the slidable part 5 having been drawn out one notch by the deflecting baffle, and held in this new position by the spring clip 15 (Fig. 1) falling into one of the notches in the member 4. Near the end of this revolution the pin 6 strikes the beveled end of the first step 11 of the echelon plate 10, and the pin and slidable extension are raised, as shown in Fig. 9, disengaging the nib 8 of part 4 from engagement with the tooth 9 of gear 2, the crank then turning freely and the gear 2 standing idle until the pin 6 reaches the baffle 12 when it stops. Another exposure having been made, the crank is turned against the resistance of the baffle 12, the slidable part 5 again being advanced one notch.

As the pin reaches the end of the baffle 12, it drops off the end of the elevated plate 10, and the nib 8 re-engages, through the spring action of the resilient crank with the teeth of gear 2, the crank then turning the gear 2 until disengaged by the pin 6 being raised by the bevel 11, the gear 2 remaining idle for a larger fraction of the revolution than in the previous operation. Another exposure is made and the crank is turned, again engaging gear 2 at the end of plate 10, and so on until the last exposure has been made, when the pin 6 no longer meets with any additional resistance from striking a baffle, and the crank is turned enough revolutions to wind up the protecting paper backing at the end of the film roll.

The figures or letters stamped on the slidable part 5 serve to indicate the number of times the part 5 has been advanced, and hence the number of exposures made.

Figs. 11 and 12 show another method of feeding the slidable portion of the crank forward, the part 4 carrying an extension on which is mounted a pawl 17 adapted to contact with a pin 18 set in the bed plate, the part 5 being serrated on one edge 19. In this alternative method of feeding the slidable part of the crank forward, the pawl 17 contacts the pin 18 as the crank revolves, and by engagement with the toothed rack 19 feeds the slidable part 5 forward one tooth, the pawl being returned to normal position by a light spring (not shown).

I claim as my invention:

1. Compensating winding mechanism for winding equal increments of resilient material comprising a winding shaft, a gear attached thereto, a second gear meshing with said first mentioned gear, and a crank operatively associated with said second gear, means for disengaging the crank from said second gear at predetermined angular positions, said crank being constructed in two parts, one of which is slidable relative to the other, and means for advancing the said slidable part of the crank at each of said disengagements.

2. Compensating winding mechanism comprising a winding shaft, a gear attached thereto, a second gear meshing with said first mentioned gear, a crank operatively associated with said second gear, said crank being constructed in two parts, one of which is slidable relative to the other, a stepped plate disposed adjacent to said second gear, and means upon said crank cooperating with said plate to disengage the crank from operative connection with said second gear for variable fractions of its circumferential travel.

3. Compensating winding mechanism comprising a winding shaft, a gear attached thereto, a second gear meshing with said first mentioned gear, a crank operatively associated with said second gear, said crank being constructed in two parts, one of which is slidable relative to the other, a stepped plate disposed adjacent to said second gear, said plate having beveled steps, and means upon said crank cooperating with said plate to disengage the crank from operative connection with said second gear for variable fractions of its circumferential travel.

4. Compensating winding mechanism comprising a winding shaft, a gear attached thereto, a second gear meshing with said first mentioned gear, a crank operatively associated with said second gear, said crank being constructed in two parts, one of which is slidable relative to the other, a stepped plate, having beveled steps, disposed adjacent to said second gear, and means associated with said plate for advancing the slidable part of the crank so as to engage the steps of the stepped plate progressively further from the axis of revolution of the crank, said plate affording means for disengaging the crank from said second gear at predetermined points.

5. Compensating winding mechanism comprising a winding shaft, a gear attached thereto, a second gear meshing with said first mentioned gear, a crank operatively associated with said second gear, said crank being constructed in two parts, one of which is slidable relative to the other, a stepped plate, having beveled steps, disposed adjacent to said second gear, and baffles associated with said plate for advancing the slidable part of the crank so as to engage the successive steps of the stepped plate, said steps affording means for disengaging the crank from and re-engaging it with said second gear at predetermined points.

6. Compensating winding mechanism for winding equal increments of resilient material, comprising a winding shaft, a gear attached thereto, a second gear meshing with said first mentioned gear, a crank operatively associated with said second gear, means for disengaging the crank from said second gear at predetermined angular positions of said crank, said crank being constructed in two parts, one of which is slidable relative to the other and means for advancing the said slidable part of the crank at each of said disengagements, said crank carrying data for indicating the number of times the slidable part of the crank has been advanced.

7. Compensating winding mechanism for winding equal increments of resilient material, comprising a winding shaft, a gear attached thereto, a second gear meshing with said first mentiond gear, a crank operatively associated with said second gear, means for disengaging the crank from said second gear at predetermined angular positions of said crank, said crank being constructed in two parts, one of which is slidable relative to the other and means for advancing the said slidable part of the crank at each of said disengagements, and means for locking the two parts of the crank in a desired position.

8. Compensating winding mechanism for winding equal increments of resilient material comprising a winding shaft, a gear attached thereto, a second gear meshing with said first mentioned gear, a crank operatively associated with said second gear, means for disengaging the crank from said second gear at predetermined angular positions of said crank, said crank being constructed in two parts, one of which is slidable relative to the other and means for advancing the said slidable part of the crank at each of said disengagements, and means for locking the two parts of the crank in a desired position, comprising a spring tensioned clip carried by one part adapted to register with one of a number of notches carried by the other part.

In testimony whereof I affix my signature.

EUGENE C. THOMPSON.